Sept. 6, 1932.  A. W. WOODWARD  1,875,402
RIM ASSEMBLY
Filed June 23, 1931
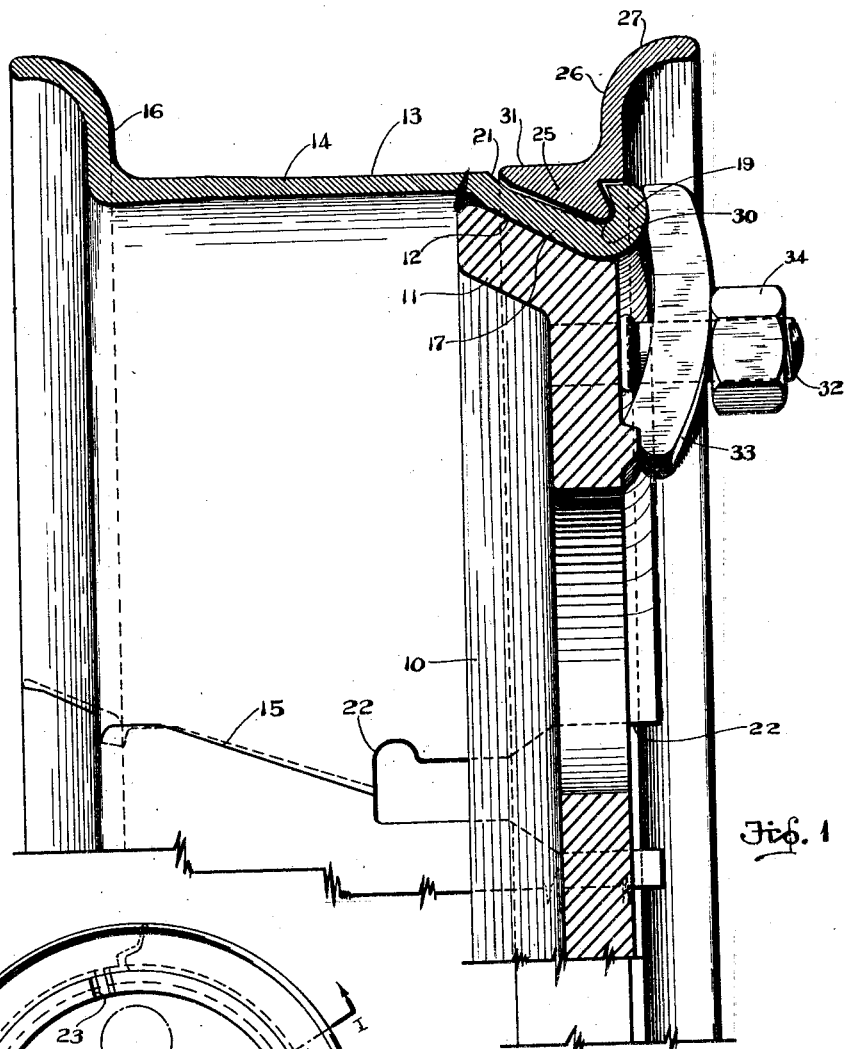
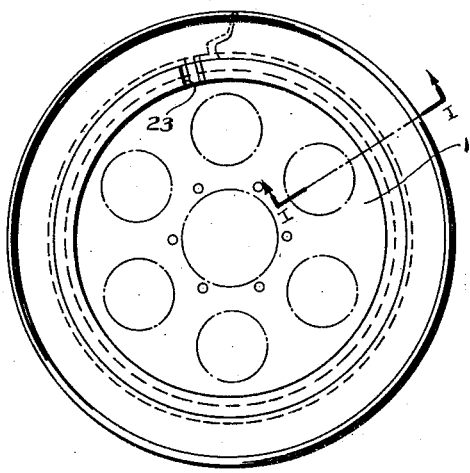
Inventor
Alva W. Woodward
By
Attorney Patented Sept. 6, 1932

1,875,402

UNITED STATES PATENT OFFICE

ALVA W. WOODWARD, OF AKRON, OHIO, ASSIGNOR TO THE GOODYEAR TIRE & RUBBER COMPANY, OF AKRON, OHIO, A CORPORATION OF OHIO

RIM ASSEMBLY

Application filed June 23, 1931. Serial No. 546,262.

The invention relates to pneumatic tire-supporting rims, and it has particular relation to a rim having a single inclined seat on its inner periphery for mounting the rim on a single inclined seat on a wheel.

One object of the invention is to provide an improved rim comprising a transversely split base member and an endless side ring that is particularly adapted to be mounted on standard wheels having seats inclined with respect to the axis of the wheel.

Another object of the invention is to provide a rim of the above-designated character in which radially directed loads on the endless side ring will be relayed directly to the periphery of the wheel through an inclined seating portion of the transversely split portion of the rim.

Another object of the invention is to provide a rim comprising a transversely split base portion having an inclined seat at one edge and an outwardly directed flange at the termination of the inclined portion, in combination with an endless side ring partially disposed in the gutter thus formed in the split section, wherein load stresses in the flange will be reduced to a minimum.

For a better understanding of the invention, reference may now be had to the accompanying drawing, wherein Fig. 1 is a cross-sectional view on a larger scale, taken substantially along the line I—I of Fig. 2, and Fig. 2 is a side-elevational view of a wheel and rim construction provided according to one form of the invention.

Referring to the figures, a wheel 10 is provided having an enlarged outer peripheral portion 11. The outer surface of the portion 11 is inclined with respect to the axis of the wheel, as indicated at 12, for the purpose of providing an inclined seat for a rim 13. The rim 13 comprises a base portion 14 transversely split, as indicated at 15, which has a tire-engaging flange 16 at one edge. At its opposite edge the rim is provided with a portion 17 inclined with respect to the axis of the rim, which is adapted to seat on the inclined seat 12 of the wheel. A flange 19 extends from the radially inner edge of the inclined portion 17 of the rim, outwardly from the axis of the wheel in a direction substantially radially, although preferably it is directed slightly toward the median centerline of the split section 14. The inclined portion 17 and the flange 19 provide an annular gutter 21 in the split section 14 of the rim.

Preferably, the split 15 communicates with a valve stem opening 22, which extends from a point substantially centrally of the rim through the inclined portion 17 and the flange 19, as indicated generally at 22. Adjacent the valve stem opening 22, the outer periphery of the wheel 10 is provided with a corresponding, transversely directed opening 23 for accommodating the valve stem. The gutter 21 in the split section 14 of the rim is adapted to receive a substantially complementary portion 25 of an endless side ring 26 having a tire-engaging flange 27 substantially identical with the tire-engaging flange 16 but oppositely disposed with respect thereto. The tire-engaging flange 27 on the endless side ring is offset slightly with respect to portion 25 and extends laterally over the flange 19 on the split section. However, the offset portion of the endless side ring does not contact with the outer peripheral surface of the flange 19, and accordingly, any radially directed load on the endless side ring, such as is imposed when the rim and a tire thereon support a vehicle, is not relayed to the outer surface of the flange. The portion 25 of the endless side ring is so constructed that it engages the interior surface of the gutter 21 only in the laterally arcuate region defined by the junction of the inclined portion 17 and the flange 19, as indicated at 30. In other words, the endless side ring 26 engages the transversely split section 14 of the rim only at the base of the gutter 21, and particularly in the region defined by the junction of the inclined portion 17 and the flange 19.

When the rim is mounted on the wheel, the region of engagement of the endless side ring 26 and the transversely split section 24 is disposed directly over a portion of the inclined surface 12 of the wheel, and therefore any loads on the side ring are relayed directly through the flange 17 of the split section of the rim to the inclined seat on the wheel. The outer peripheral surface of the portion 25 disposed in the gutter 21, which is indicated at 31, coincides substantially with the plane of the outer peripheral surface of the base portion of the split section between the inclined portion 17 and the tire-engaging flange 16. Hence, it is apparent that radially directed loads on the axially directed surfaces of the split section of the rim, as well as in the side ring, will be relayed to the wheel directly through the inclined portion 17.

The rim 13 is mounted on the wheel 10 in a conventional manner by stud bolts 32 projecting from the wheel through clamps 33, and which have nuts 34 on their outer ends engaging the clamps. The outer peripheral portions of the clamps engage the flange 19 of the rim and maintain the rim on the seat 12 of the wheel. This means of fastening the rim on the seat 12 is one of many that may be used for this purpose.

The construction provided by the invention obviates undesirable bending and other stresses in the flange 19 of the split section of the rim. If the endless side ring 26 rested directly on the outer surface of the flange 19, the latter would be subjected to considerable bending stresses when the rim supported a vehicle, because of the fact that the endless side ring would support a considerable portion of this load, and the load would be relayed directly to the outer surface of the flange 19 and bending of the latter would be apt to occur about the junction of the flange and inclined portion 17. Loads that are imparted to the rim during its operation vary considerably from the standard load of the vehicle to forces that considerably exceed this load because of sudden shocks imparted to the rim during its operation over rough pavements and the like. The rim, as well as the assembly of the rim with the wheel, are very desirable and efficient because failure of rims in operation is prevented considerably by associating the endless side ring and the transversely split section in the manner described and illustrated.

Although I have illustrated and described but the preferred form which the invention may assume, and have described that form in detail, it will be apparent to those skilled in the art that the invention is not so limited but that various modifications may be made therein without departing from the spirit of the invention or from the scope of the appended claims.

What I claim is:

1. In combination, a transversely split rim section having a tire-engaging flange at one edge, a base portion, a supporting portion at its other edge inclined toward the axis of the section and terminating in a flange directed away from the axis of the rim, thereby providing a gutter in the section, an endless side ring interlocked with the split section, said ring having a portion disposed in the gutter ring of the split section and engaging the latter only in the region of the junction of the inclined portion and flange defining the gutter, a tire retaining flange on the endless side ring in substantial alignment with the flange defining the gutter in the split section.

2. In combination, a transversely split rim section having a portion at one edge inclined toward the axis of the section and terminating in a flange directed away from the axis of the rim, thereby defining a gutter, the outer surface of the region defining the junction of the inclined portion and the flange being arcuate laterally, an endless side ring partially disposed in the gutter of the split section, that portion of the side ring disposed in the gutter engaging the split section only in the region defined by the arcuate surface, a tire retaining flange on the endless side ring in substantial alignment with the flange defining the gutter in the split section.

3. A rim comprising a transversely split section having a gutter at one edge defined by an axially inclined portion and a flange directed outwardly from the axis, and an endless side ring partially disposed in the gutter of the split section and engaging the latter only on the interior surface of the gutter.

In witness whereof, I have hereunto signed my name at Akron, in the county of Summit and State of Ohio, U. S. A., this 17th day of June, 1931.

ALVA W. WOODWARD.